(12) United States Patent
Eshima et al.

(10) Patent No.: US 11,305,642 B2
(45) Date of Patent: Apr. 19, 2022

(54) VEHICLE

(71) Applicant: Yamaha Hatsudoki Kabushiki Kaisha, Shizuoka (JP)

(72) Inventors: Makoto Eshima, Shizuoka (JP); Yoichiro Deguchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 17/113,131

(22) Filed: Dec. 7, 2020

(65) Prior Publication Data

US 2021/0170861 A1    Jun. 10, 2021

(30) Foreign Application Priority Data

Dec. 10, 2019    (JP) .............. JP2019-222867

(51) Int. Cl.
| | |
|---|---|
| *B60K 13/04* | (2006.01) |
| *F01N 13/18* | (2010.01) |
| *B60K 13/06* | (2006.01) |
| *F01N 1/08* | (2006.01) |
| *F01N 3/08* | (2006.01) |
| *B60K 13/00* | (2006.01) |
| *B60K 11/00* | (2006.01) |

(52) U.S. Cl.
CPC .............. *B60K 13/04* (2013.01); *B60K 13/06* (2013.01); *F01N 1/083* (2013.01); *F01N 3/08* (2013.01); *F01N 13/185* (2013.01); *F01N 13/1805* (2013.01); *F01N 13/1838* (2013.01); *F01N 13/1894* (2013.01); *B60K 11/00* (2013.01); *B60K 13/00* (2013.01); *F01N 2470/00* (2013.01); *F01N 2510/00* (2013.01)

(58) Field of Classification Search
CPC ........ B60K 13/04; B60K 13/00; B60K 13/06; B60K 11/00; F01N 13/1838; F01N 13/185; F01N 3/08; F01N 13/1805; F01N 1/083; F01N 13/1894; F01N 2470/00; F01N 2510/00
USPC ...................................... 180/309
See application file for complete search history.

(56) References Cited

U.S. PATENT DOCUMENTS

| | | | |
|---|---|---|---|
| 7,699,134 B2 | 4/2010 | Terashima et al. | |
| 2016/0245148 A1* | 8/2016 | Sievers-Paulsen | ..... F01N 13/16 |
| 2017/0305263 A1* | 10/2017 | Oguri | ...................... F16F 15/08 |
| 2019/0186331 A1* | 6/2019 | Yamazaki | ........... F01N 13/1872 |

FOREIGN PATENT DOCUMENTS

| | | |
|---|---|---|
| JP | 2007-008442 A | 1/2007 |
| JP | 4535328 B2 | 6/2010 |

* cited by examiner

*Primary Examiner* — Yi-Kai Wang
(74) *Attorney, Agent, or Firm* — HEA Law PLLC

(57) ABSTRACT

The vehicle of the present application includes a vehicle frame; a muffler supported by the vehicle frame; and a supporting unit comprising a rubber damper, located between the muffler and the vehicle frame and, connected to the vehicle frame such that the muffler is suspended from the vehicle frame and supported by the vehicle frame. The supporting unit comprises a first bracket and a second bracket on the first bracket.

8 Claims, 6 Drawing Sheets

VEHICLE

CROSS-REFERENCE TO RELATED APPLICATION

The present application claims priority from Japanese application JP 2019-222867, filed on Dec. 10, 2019, the content of which is hereby incorporated by reference into this application.

FIELD OF THE INVENTION

The invention relates to a vehicle. More specifically, the invention relates to a vehicle comprising a vehicle frame and a muffler suspended from the vehicle frame and supported by the vehicle frame.

BACKGROUND OF THE INVENTION

Description of the Related Art

Some vehicles comprise the respective vehicle frames and mufflers suspended from the respective vehicle frame and supported by the respective vehicle frame. In such vehicles, the mufflers are suspended from the vehicle frames and supported by the vehicle frames via a supporting unit consisting of a metal plate. For example, JP2007-8442A discloses a motorcycle comprising an arm and a muffler suspended from the arm and supported by the arm via an attachment. JP2007-8442A discloses a motorcycle comprising a sheet frame and a muffler suspended from the sheet frame and supported by the sheet frame via a stay.

In such structures, a rubber damper is used to suppress propagation of vibration of the muffler to the vehicle frames. The muffler receives heat from exhaust gas flowing inside the muffler, and the heat increases a temperature of the muffler. Then, the heat reaches the rubber damper via the supporting unit. Considering above, the rubber damper is required to consist of a stable material so as to maintain the properties of the rubber damper despite the heat from the muffler.

SUMMARY OF THE INVENTION

In view of the above, it is an object of the present invention to suppress an increase in the temperature of the rubber damper caused by the heat from the muffler.

(1) The vehicle of the present application comprises: a vehicle frame; a muffler supported by the vehicle frame; and a supporting unit comprising a rubber damper, located between the muffler and the vehicle frame and, connected to the vehicle frame such that the muffler is suspended from the vehicle frame and supported by the vehicle frame. The supporting unit comprises a first bracket and a second bracket on the first bracket. The first bracket comprises a first body distant from the outer surface of the muffler and a first attachment attached to the outer surface of the muffler, and extending along a first axis from the first body on the outer surface of the muffler. The second bracket comprises a second body distant from the first bracket and a holder on the second body, configured to hold the rubber damper and connected to the vehicle frame via the rubber damper, and a second attachment attached to the first attachment of the first bracket, and extending from the second body. The supporting unit expands a heat transfer path from the muffler to the rubber damper. As a result, an increase in the temperature of the rubber damper is suppressed, thereby providing more freedom to select various types of material for the rubber damper.

(2) In the vehicle of (1), the first and second attachments are arranged such that a position of the first attachment is displaced from a position of the second attachment on a second axis along the outer surface and crossing the first axis. The arrangement of the first and second attachments expand a heat transfer path from the muffler to the rubber damper. As a result, an increase in the temperature of the rubber damper is further suppressed, thereby providing more freedom to select various types of material for the rubber damper.

(3) In the vehicle of (1), the first attachment comprises at least two sub-attachments, and one of the at least two sub-attachments extends toward one direction along the first axis while the other extends toward the opposite direction.

(4) In the vehicle of (3), each of the at least two sub-attachments is disposed on a different position on the second axis. The arrangement of the at least two sub-attachments expands a heat transfer path from the muffler to the rubber damper. As a result, increase in the temperature of the rubber damper is further suppressed, thereby providing more freedom to select various types of material for the rubber damper.

(5) In the vehicle of (1), the second attachment comprises at least two sub-attachments, and one of the at least two sub-attachments extends toward one direction along the first axis while the other extends toward the opposite direction.

(6) In the vehicle of (5), each of the at least two sub-attachments is disposed on a different position on the second axis. The arrangement of the at least two sub-attachments expands a heat transfer path from the muffler to the rubber damper. As a result, increase in the temperature of the rubber damper is further suppressed, thereby providing more freedom to select various types of material for the rubber damper.

(7) In the vehicle of (1), the first attachment comprises at least two sub-attachments; the second attachment comprises at least two sub-attachments; one of the at least two sub-attachments of the first attachment extends toward one direction along the second axis from the first body while the other extends toward the opposite direction from the first body; one of the at least two sub-attachments of the second attachment extends toward one direction along the second axis from the second body while the other extends toward the opposite direction from the second body; each of the at least two sub-attachments of the first attachment is disposed on a different position on the first axis; each of the at least two sub-attachments of the second attachment is disposed on a different position on the first axis; a position of one of the at least two sub-attachments of the first attachment coincides with a position of one of the at least two sub-attachments of the second attachment on the first axis; the one of the at least two sub-attachments of the first attachment extends toward one direction along the second axis while the one of the at least two sub-attachments of the second attachment extends toward the opposite direction along the second axis; a position of the other of the at least two sub-attachments of the first attachment coincides with a position of the other of the at least two sub-attachments of the second attachment on the first axis; and the other of the at least two sub-attachments of the first attachment extends toward one direction along the second axis while the other of the at least two sub-attachments of the second attachment extends toward the opposite direction along the second axis. The arrangement of the first and second attachments expands a heat transfer path from the muffler to the rubber damper. As a result, an increase in the temperature of the rubber damper is further suppressed, thereby providing more freedom to select various types of material for the rubber damper.

The vehicle according to the invention comprises the supporting unit disposed on the muffler and configured to hold the rubber damper, and the supporting unit comprises the first bracket and the second bracket on the first bracket. Thus, the supporting unit makes the heat transfer path from the muffler to the rubber damper longer. As a result, the supporting unit better attenuates heat from the muffler to the rubber damper to suppress increase in the temperature of the rubber damper, thereby providing more freedom to select various types of material for the rubber damper.

DETAILED DESCRIPTION OF THE INVENTION

Figure 1:
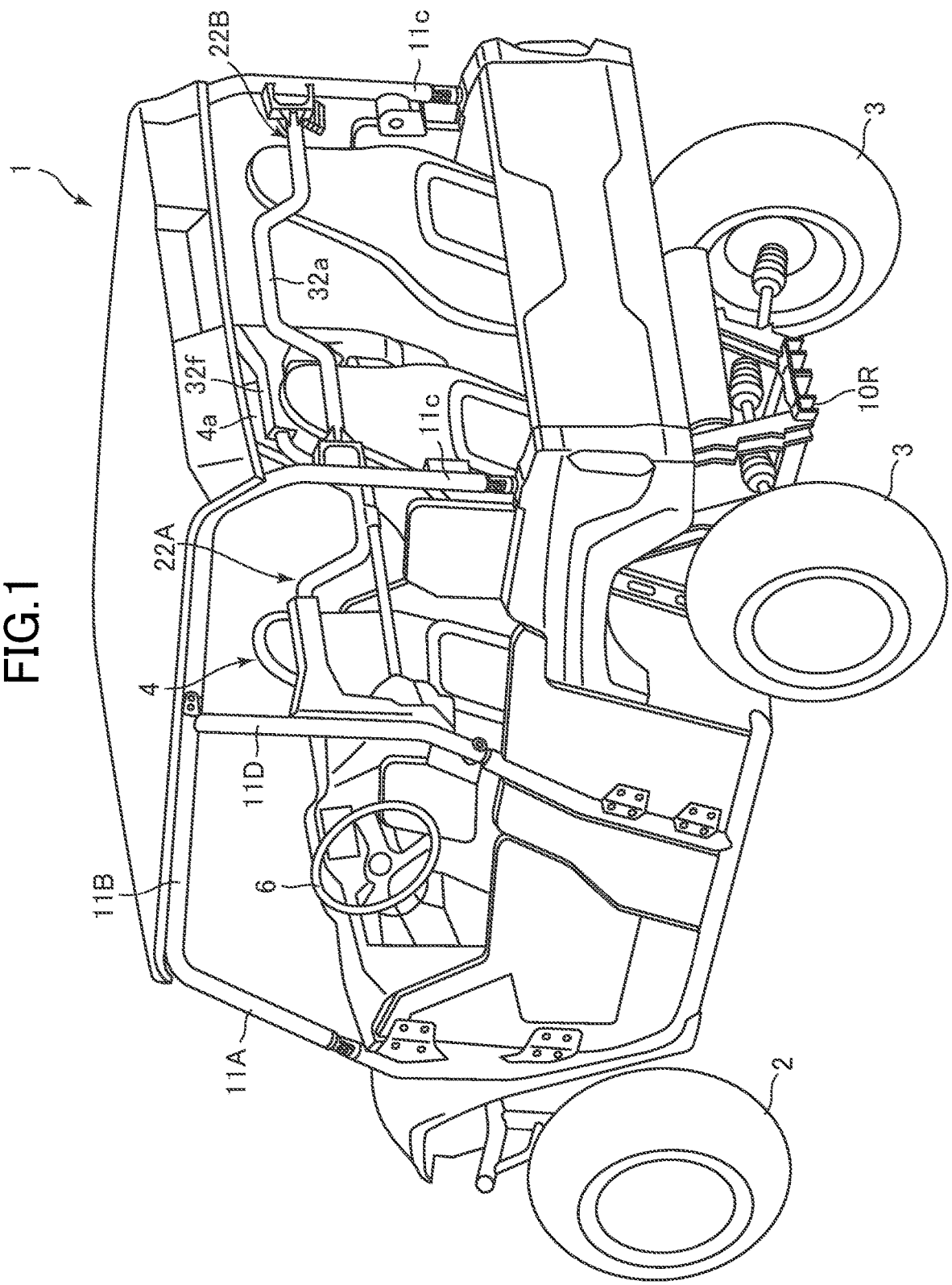
FIG. 1 schematically shows a perspective view of a vehicle according to one embodiment.
Figure 2:
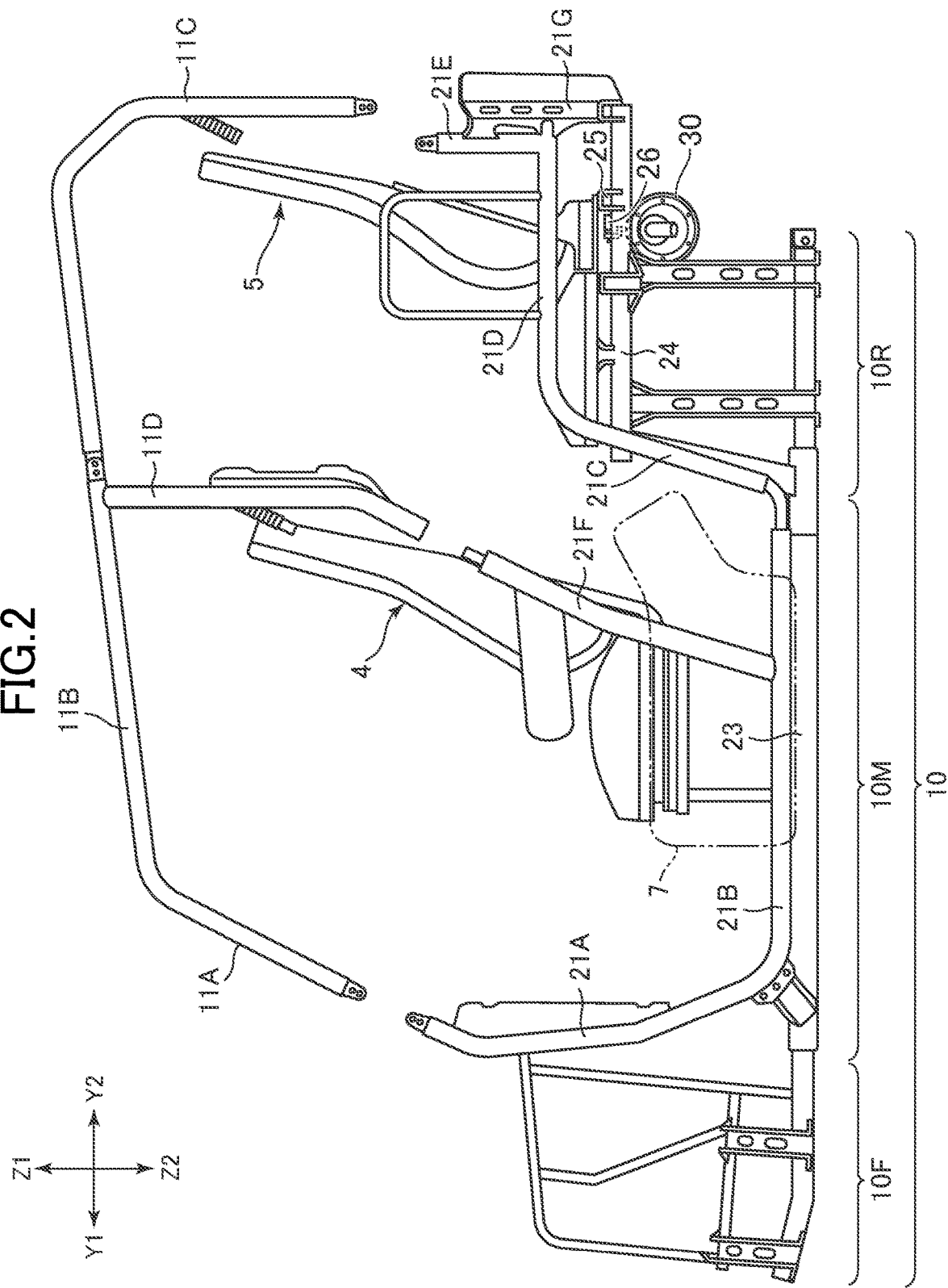
FIG. 2 schematically shows a side view of a vehicle according to one embodiment.

FIG. 1 schematically shows a vehicle according to one embodiment. FIG. 2 schematically shows a side view of a vehicle according to one embodiment. A vehicle 1 comprises a vehicle frame 10, a bottom member 23, and a floor supporting member 24 behind the bottom member 23. The vehicle frame 10 consists of a front part 10F, a middle part 10M, and a rear part 10R. The middle part 10M consists of elongate members 11A-11D in the upper part of the vehicle 1, elongate members 21A-21F in the lower part of the vehicle 1, and elongate members 22A-22B in the upper part of the vehicle 1. The rear part 10R supports the floor supporting member 24 on the rear part 10R. The floor supporting member 24 comprises an elongate member 25 which extends laterally. The elongate member 25 is located behind the rear part 10R in the side view of the vehicle 1. In the side view of the vehicle 1, a front wheel 2 overlaps with the front part 10F, and a rear wheel 3 overlaps with the rear part 10R.

In the upper half of the middle part 10M of the vehicle 1, the elongate members 11A, 11B, 11D and 11C are arranged in this order from the front to back of the vehicle 1. In the lower half of the middle part 10M of the vehicle 1, the elongate members 21A, 21B, 21F, 21C, 21D, 21E and 21G are arranged in this order from the front to back of the vehicle 1. The elongate members 11A, 11D, and 11C in the upper half are connected to the elongate members 21A, 21F, and 21E in the lower half respectively to combine the upper half with the lower half of the vehicle frame of the vehicle 1. The rear end of the elongate member 11B is connected to the elongate member 11D. The rear portion of the elongate member 21B is connected to the elongate member 21F.

In the upper half of the middle part 10M of the vehicle 1, the elongate members 11A and 11B are included in a body, and the body is folded such that the elongate member 11A extends downward and the elongate member 11B extends backward. The elongate member 11C is connected to the elongate member 11B. The former part of the elongate member 11C is arranged so as to coincide with the elongate member 11B to form one line. The latter part of the elongate member 11C is folded so as to extend downward. The elongate member 11D extends downward. The elongate member 11D is connected to the elongate member 11B behind a front seat 4 in a side view.

In the lower half of the middle part 10M of the vehicle 1, the elongate members 21A and 21B are included in a body, and the body is folded such that the elongate member 21A extends upward and the elongate member 21B extends backward. The elongate member 21C is connected to the elongate member 21B. The former part of the elongate member 21C is arranged so as to coincide with the elongate member 21B to form one line. The elongate members 21C and 21D are included in a body, and the body is folded such that the elongate member 21C extends downward and the elongate member 21D extends backward at the side of the rear seat 5. The elongate members 21E and 21D are included in a body, and the body is folded such that the elongate member 21E extends downward at the side of the rear seat 5 in a side view. The elongate member 21G is disposed on the floor supporting unit 24, and extends parallel to the elongate member 21E. The elongate member 21G is attached to the elongate member 21E so as to be next to the elongate member 21E in a side view.

The elongate members 11A and 21A form the front part of the vehicle frame of the vehicle 1. A part of the elongate members 11B and 11C forms a ceiling part of the vehicle frame. The elongate member 21B forms an area of the bottom frame of the vehicle frame of the vehicle 1, on which the front seat 4 is located. The elongate members 21C and 21D are arranged at the rear seat 5 to form a side frame of the vehicle frame.

The elongate members 11A, 11B, 21A, the former part of the elongate member 21B and the elongate member 21F, form a set of frames surrounding the front seat 4. The elongate members 11C, 11D, the latter part of the elongate member 21B and the elongate members 21C, 21D and 21E, form a set of frames surrounding the rear seat 5.

The vehicle 1 comprises the front seat 4 above the bottom part of the frame, the rear seat 5 on the floor supporting unit 24, a handle 6 in front of the front seat 4, an engine unit 7 disposed between the bottom part and the front seat in a side view, and a muffler 30 disposed behind the rear part 10R and below the floor supporting unit 24 in the vehicle 1. The elongate members 11D and 21F overlap with the front seat 4 in a side view.

In the present embodiment, the muffler 30 has a cylindrical shape. However, the muffler 30 may have other shapes such as an oval, a quadrangle, or a triangle. In the present embodiment, the elongate member 25 extends laterally. However, the elongate member 25 may extend in other directions as long as the elongate member 25 suspends and supports the muffler 30.

Figure 3:
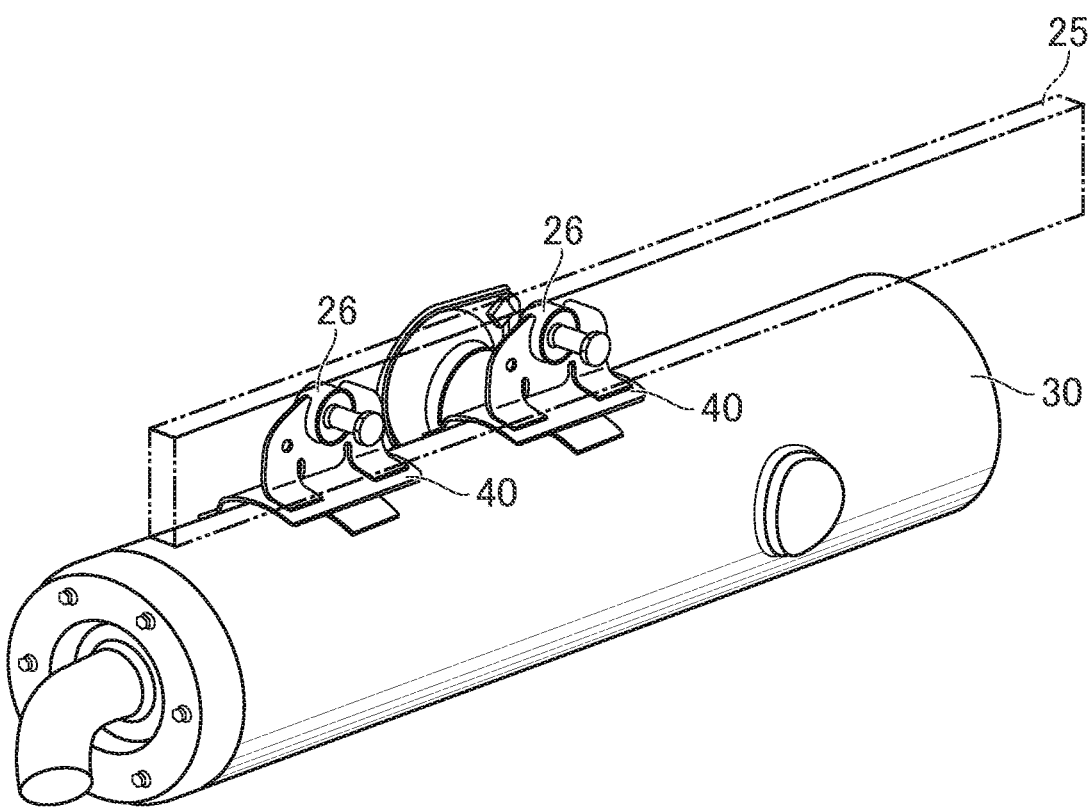
FIG. 3 schematically shows a perspective view of a supporting unit and a muffler according to one embodiment.
Figure 3:
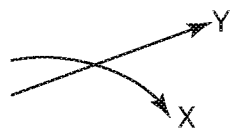
Figure 4:
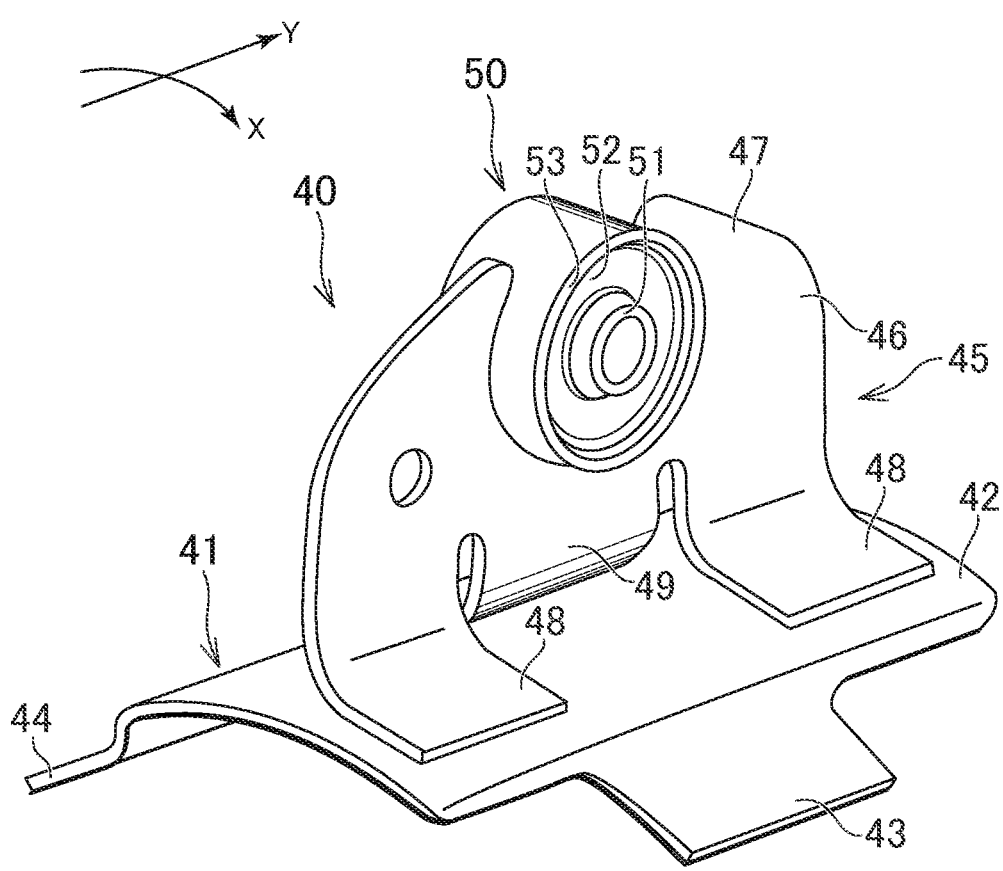
FIG. 4 schematically shows a perspective view of a supporting unit according to one embodiment.
Figure 5:
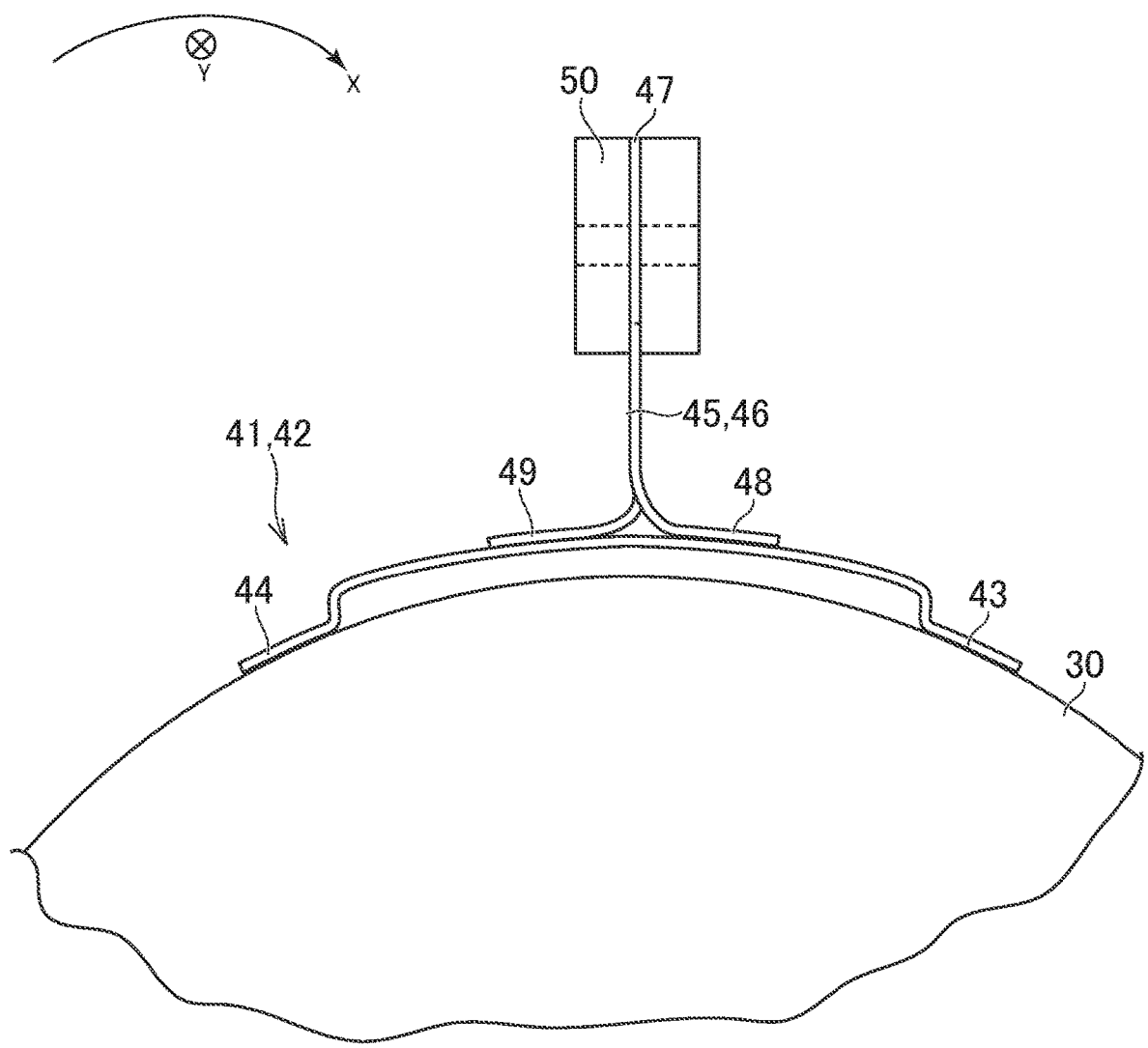
FIG. 5 schematically shows a side view of a supporting unit according to one embodiment.
Figure 6:
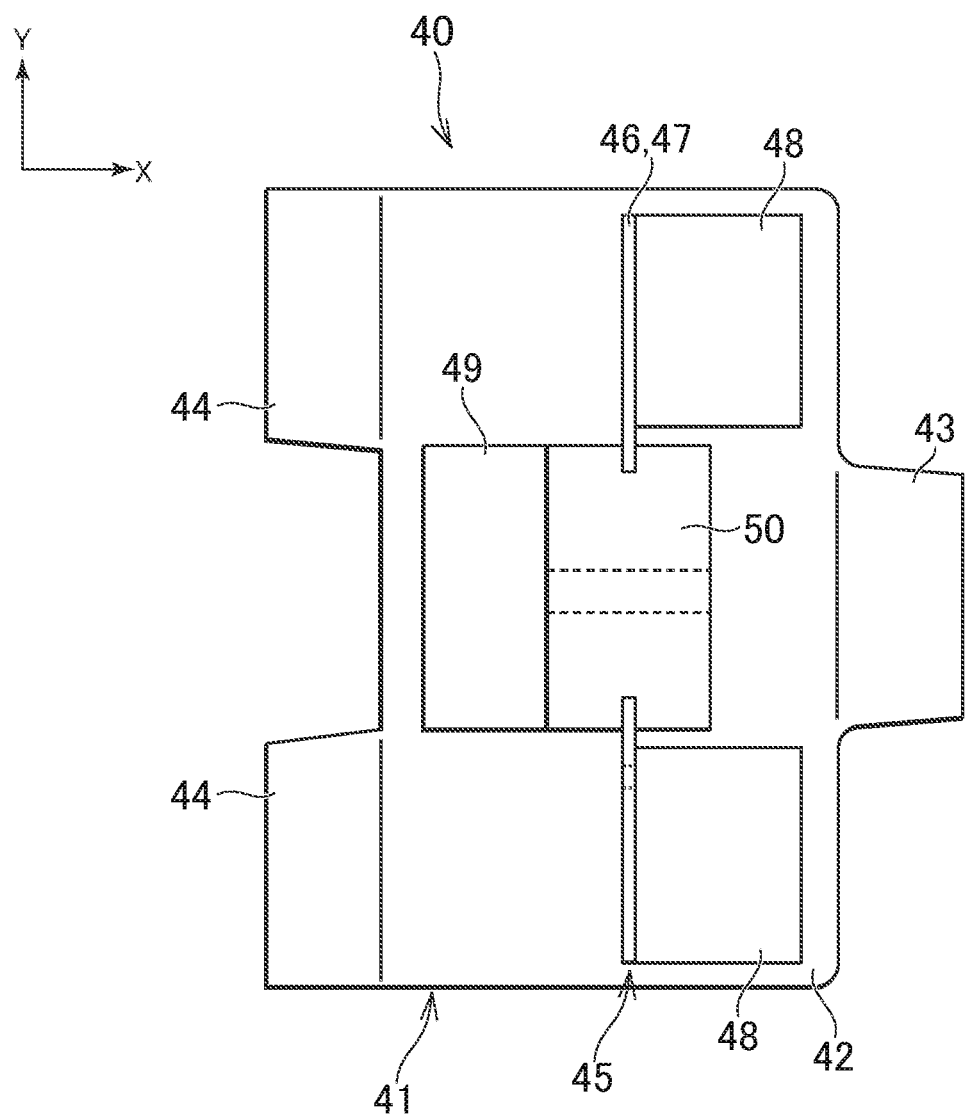
FIG. 6 schematically shows a plan view of a supporting unit according to one embodiment.

FIG. 3 schematically shows a perspective view of a supporting unit and a muffler according to one embodiment. FIG. 4 schematically shows a perspective view of a supporting unit according to one embodiment. FIG. 5 schematically shows a side view of a supporting unit according to one embodiment. FIG. 6 schematically shows a plan view of a supporting unit according to one embodiment.

The muffler 30 is suspended and supported by the elongate member 25 via the supporting unit 40. Specifically, the supporting unit 40 holds the rubber damper 50 with a holder 47, and the rubber damper 50 is connected to the elongate member 25 via a fixing member 26. The fixing member 26 is preferably a bolt, however the fixing member 26 is not limited to the bolt. The rubber damper 50 consists of an inner portion 51 made of metal, an intermediate portion 52 made of rubber, and an outer portion 53 made of metal. The intermediate portion 52 is configured to absorb vibration of the muffler 30. In the present embodiment, the rubber damper 50 has substantially an oval shape. However, the rubber damper 50 may have other shapes.

The supporting unit 40 consists of a first bracket 41 and a second bracket 45 on the first bracket 41. The first bracket 41 comprises a first body 42 and first attachments 43 and 44. The first attachments 43 and 44 are disposed on the muffler 30 while the first body 42 is spaced from the muffler 30 to form a gap between the first body 42 and the muffler 30. In the present embodiment, the first attachment 43 comprises one sub-attachment while the first attachment 44 comprises two sub-attachments. However, both first attachments 43 and 44 may comprise other numbers of sub-attachments.

The first bracket 41 consists of a metal plate. The first attachments 43 and 44 are attached to the muffler 30 so as to fix the first bracket 41 to the muffler 30 by welding. The first attachments 43 and 44 are folded so as to form a gap between the muffler 30 and the first body 42. The second body 46 of the second bracket 45 is spaced from the first bracket 41 to be positioned substantially perpendicular to the first body 42. In other words, the second body 46 is attached to the muffler 30 via the first bracket 41 and the second attachments 48 and 49 of the second bracket 45. Thus, a sufficient heat transfer path from the muffler 30 can be achieved. The second attachments 48 and 49 are attached to the first body 42 by welding, thereby fixing the second bracket 45 to the first bracket 41. The second attachments 48 and 49 are folded from the second body 46 to contact the first body 42. The holder 47 has a concave shape to accommodate the rubber damper 50. The concave shape is adapted to the outer shape of the outer portion 53 of the rubber damper 50. The rubber damper 50 is disposed to connect to the elongate member 25 via the fixing member 26, which is inserted into the inner portion 51. The rubber damper 50 is attached to the holder 47 of the supporting unit 40 by a weld.

A position of the first attachment 43 is displaced from a position of the first attachment 44 on a y-axis corresponding to the longitudinal direction of the muffler 30. The first attachment 43 extends toward one direction of the X-axis, corresponding to the perimeter of the muffler 30 while the first attachment 44 extends toward the opposite direction. The second bracket 45 comprises the second body 46, the holder 47, and the second attachments 48 and 49. The second body 46 receives the rubber damper 50 at the concave holder 47. In the present embodiment, the second attachment 48 comprises one sub-attachment while the second attachment 49 comprises two sub-attachments. However, the second and third attachments 48 and 49 may comprise other numbers of sub-attachments. The second attachment 48 extends toward one direction of the X-axis while the second attachment 49 extends toward the opposite direction. A position of the second attachment 48 is displaced from a position of the second attachment 49 on a Y-axis. The first attachment 43 extends toward one direction of the X-axis while the second attachment 49 extends toward the opposite direction. The first attachment 44 extends toward one direction of the X-axis while the second attachment 48 extends toward the opposite direction.

In the present application, the term "displacement of a position of one attachment from a position of the other attachment" means that a central position of one attachment does not coincide with a central position of the other attachment in an axis in which both attachments extend. Preferably, the term "displacement of a position of one attachment from a position of the other attachment" means that one line parallel to the axis does not overlap with the one attachment but overlaps with the other attachment.

In the present application, the term "one attachment extending toward one direction while the other attachment extending toward the opposite direction" means that one direction in which the one attachment extends forms an obtuse angle with the other direction in which the other attachment extends. Preferably, the term "one attachment extending toward one direction while the other attachment extending toward the opposite direction" means that one direction in which the one attachment extends forms an angle of 180 degree with the other direction in which the other attachment extends.

The first body 42 of the first bracket 41 does not contact the muffler 30. Thus, heat generated from the muffler 30 is transferred to the first attachments 43 and 44 of the first bracket 41, and then transferred to the first body 42. After the heat is transferred to the first body 42, the heat is transferred to the second attachments 48 and 49 of the second bracket 45, and then transferred to the rubber damper 50 via the holder 47. Since the supporting unit 40 consists of two brackets, the supporting unit conducts less heat than any conventional supporting unit consisting of one component. Thus, heat from the muffler 30 is more attenuated. As a result, less heat is conducted to the rubber damper 50. Thus, an increase in temperature of the rubber damper 50 is suppressed.

The respective positions of the first attachments 43 and 44 of the first bracket 41 are displaced from the respective positions of the second attachments 48 and 49 of the second bracket 45. The displacement of the respective positions of the first attachments 43 and 44 of the first bracket 41 from the respective positions of the second attachments 48 and 49 of the second bracket 45 expands a heat transfer path from the first attachments 43 and 44 to the second bracket 45 via the first body 42. Thus, heat from the muffler 30 is attenuated in the heat transfer path. As a result, less heat is conducted to the rubber damper 50. Thus, an increase in the temperature of the rubber damper 50 is further suppressed.

The first attachment 43 of the first bracket 41 extends toward one direction of the X-axis while the first attachment 44 of the first bracket 41 extends toward the opposite direction. The position of the first attachment 43 is displaced from the position of the first attachment 44 on the Y-axis. Thus, the above-mentioned arrangement expands heat transfer path from the muffler 30 to the second bracket 45, compared with any conventional arrangement in which the position of the first attachment 43 is aligned with the position of the first attachment 44 on the Y-axis. Thus, heat from the muffler 30 is attenuated in the heat transfer path. As a result, less heat is conducted to the rubber damper 50. Thus, an increase in temperature of the rubber damper 50 is further suppressed.

The second attachment 48 of the second bracket 45 extends toward one direction of the X-axis while the second attachment of the second bracket 45 extends toward the opposite direction. The position of the second attachment 48 is displaced from the position of the first attachment 44 on the Y-axis. Thus, the above-mentioned arrangement expands a heat transfer path of the second bracket 45 to the rubber damper 50, compared with any conventional arrangement in which the position of the second attachment 48 is aligned with the position of the second attachment 49 on the Y-axis. Thus, heat from the muffler 30 via the second bracket 45 is attenuated in the heat transfer path. As a result, less heat is conducted to the rubber damper 50. Thus, an increase in temperature of the rubber damper 50 is further suppressed.

The first attachment 43 of the first bracket 41 and the second attachment 48 of the second bracket 45 extend in the same direction in the X axis but are displaced from each other on the Y-axis. The first attachment 43 of the first bracket 41 and the second attachment 49 of the second bracket 45 are aligned with each other on the Y-axis. However, the first attachment 43 extends toward one direction of the X axis while the second attachment 49 extends toward the opposite direction of the X axis. The first attachment 44 of the first bracket 41 and the second attachment 49 of the second bracket 45 extend the same direction in the X axis but are displaced from each other on the Y-axis. The first attachment 44 of the first bracket 41 and the second attachment 48 of the second bracket 45 are aligned with each other on the Y-axis. However, the first attachment 44 extends toward one direction of the X axis while the second attachment 48 extends toward the opposite direction of the X axis. Thus, heat from the muffler 30 via the second bracket 45 is attenuated in the heat transfer path. As a result, less heat is conducted to the rubber damper 50. Thus, an increase in temperature of the rubber damper 50 is further suppressed.

Summary (1) As described above, the vehicle 1 of the present application comprises: a vehicle frame 25; a muffler 30 supported by the vehicle frame 25; and a supporting unit 40 comprising a rubber damper 50, located between the muffler 30 and the vehicle frame 25 and, connected to the vehicle frame 25 such that the muffler 30 is suspended from the vehicle frame 25 and supported by the vehicle frame 25, wherein: the supporting unit 40 comprises a first bracket 41 and a second bracket 45 on the first bracket 41; the first bracket 41 comprises a first body 42 distant from the outer surface of the muffler 30 and a first attachment 43 and 44 attached to the outer surface of the muffler 30, and extending along a first axis X from the first body 42 on the outer surface of the muffler 30; the second bracket 45 comprises a second body 46 distant from the first bracket 41 and a holder 47 on the second body 46, configured to hold the rubber damper 50 and connected to the vehicle frame 25 via the rubber damper 50, and a second attachment 48, 49 attached to the first attachment 43 and 44 of the first bracket 41, and extending from the second body 46. The supporting unit expands a heat transfer path from the muffler 30 to the rubber damper 50. As a result, an increase in the temperature of the rubber damper 50 is suppressed, thereby providing more freedom to select various types of material of the rubber damper 50.

(2) In the vehicle 1 of (1), the first and second attachments 43, 44, 48, and 49 are arranged such that the first attachment 43 and 44 is displaced from the second attachment 48 and 49 with respect to a second axis along the outer surface and crossing the first axis X. The arrangement of the first and second attachments 43, 44, 48, and 49 expands a heat transfer path from the muffler 30 to the rubber damper 50. As a result, an increase in the temperature of the rubber damper 50 is further suppressed, thereby providing more freedom to select various types of material of the rubber damper 50.

(3) In the vehicle 1 of (1), the first attachment 43 and 44 comprises at least two sub-attachments 43 and 44, and one of the at least two sub-attachments 43 and 44 extends toward one direction along the first axis X while the other extends toward the opposite direction.

(4) In the vehicle 1 of (3), each of the at least two sub-attachments 43 and 44 is disposed on a different position on the second axis Y. The arrangement of the at least two sub-attachments 43 and 44 expands a heat transfer path from the muffler 30 to the rubber damper 50. As a result, an increase in the temperature of the rubber damper 50 is further suppressed, thereby providing more freedom to select various types of material of the rubber damper 50.

(5) In the vehicle 1 of (1), the second attachment comprises at least two sub-attachments 48 and 49, and one of the at least two sub-attachments 48 and 49 extends toward one direction along the first axis X while the other extends toward the opposite direction.

(6) In the vehicle 1 of (5), each of the at least two sub-attachments 48 and 49 is disposed on a different position on the second axis. The arrangement of the at least two sub-attachments 48 and 49 expands a heat transfer path from the muffler 30 to the rubber damper 50. As a result, an increase in the temperature of the rubber damper 50 is further suppressed, thereby providing more freedom to select various types of material of the rubber damper 50.

(7) In the vehicle 1 of (1), the first attachment 43 and 44 comprises at least two sub-attachments 43 and 44; the second attachment 48 and 49 comprises at least two sub-attachments 48 and 49; one of the at least two sub-attachments 43 and 44 of the first attachment 43 and 44 extends toward one direction along the second axis X from the first body 42 while the other extends toward the opposite direction from the first body 42; one of the at least two sub-attachments 48 and 49 of the second attachment 48 and 49 extends toward one direction along the second axis X from the second body 46 while the other extends toward the opposite direction from the second body 46; each of the at least two sub-attachments 43 and 44 of the first attachment 43 and 44 is disposed on a different position on the first axis Y; each of the at least two sub-attachments 48 and 49 of the second attachment 48 and 49 is disposed on a different position on the first axis Y; a position of one of the at least two sub-attachments 43 and 44 of the first attachment 43 and 44 coincides with a position of one of the at least two sub-attachments 48 and 49 of the second attachment 48 and 49 on the first axis Y; the one of the at least two sub-attachments 43 and 44 of the first attachment 43 and 44 extends toward one direction along the second axis X while the one of the at least two sub-attachments 48 and 49 of the second attachment 48 and 49 extends toward the opposite direction along the second axis X; a position of the other of the at least two sub-attachments 43 and 44 of the first attachment 43 and 44 coincides with a position of the other of the at least two sub-attachments 48 and 49 of the second attachment 48 and 49 on the first axis Y; and the other of the at least two sub-attachments 43 and 44 of the first attachment 43 and 44 extends toward one direction along the second axis while the other of the at least two sub-attachments 48 and 49 of the second attachment 48 and 49 extends toward the opposite direction along the second axis X. The arrangement of the first and second attachments expands a heat transfer path from the muffler 30 to the rubber damper 50. As a result, an increase in the temperature of the rubber damper 50 is further suppressed, thereby providing more freedom to select various types of material of the rubber damper 50.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A vehicle comprising:
a vehicle frame; a muffler supported by the vehicle frame; and a supporting unit comprising a rubber damper, located between the muffler and the vehicle frame and, connected to the vehicle frame such that the muffler is suspended from the vehicle frame and supported by the vehicle frame,
wherein:
the supporting unit comprises a first bracket and a second bracket on the first bracket;
the first bracket comprises a first body distant from an outer surface of the muffler and a first attachment attached to an outer surface of the muffler, and extending along a first axis from the first body on the outer surface of the muffler; and
the second bracket comprises a second body distant from the first bracket and a holder on the second body, configured to hold the rubber damper and connected to the vehicle frame via the rubber damper, and a second attachment attached to the first attachment of the first bracket, and extending from the second body;
wherein the first attachment comprises: a first sub-attachment, a second sub-attachment and a third sub-attachment,
wherein the second attachment comprises: a fourth sub-attachment, a fifth sub-attachment and a sixth sub-attachment,
wherein the first sub-attachment is positioned in between the fourth sub-attachment and the fifth sub-attachment in a second axis along the outer surface and crossing the first axis.

2. The vehicle of claim 1, wherein the second sub-attachment and the third sub-attachment are disposed on a different position on the second axis.

3. The vehicle of claim 1, wherein at least one of the fourth sub-attachment, the fifth sub-attachment or the sixth sub-attachment extends toward one direction along the first axis while a different one of the fourth sub-attachment, the fifth sub-attachment or the sixth sub-attachment extends toward an opposite direction.

4. The vehicle of claim 3, wherein the second sub-attachment and the third sub-attachment are disposed on a different position on the second axis.

5. The vehicle of claim 1, wherein:
the first attachment comprises a first sub-attachment, a second sub-attachment and a third sub-attachment; the second attachment comprises a fourth sub-attachment, a fifth sub-attachment and a sixth sub-attachment;
one of the first, second or third sub-attachments extends toward one direction along the first axis from the first body while another of the first, second or third sub-attachments extends toward an opposite direction from the first body;
one of the fourth, fifth or sixth sub-attachments of the second attachment extends toward one direction along the first axis from the second body while another of fourth, fifth or sixth sub-attachments extends toward the opposite direction from the second body;
each sub-attachments of the first attachment is disposed on a different position on the second axis;
each sub-attachments of the second attachment is disposed on a different position on the second axis;
a position of one of the first, second or third sub-attachments of the first attachment coincides with a position of one of the fourth, fifth of sixth sub-attachments of the second attachment on the second axis;
the one of the first, second or third sub-attachments of the first attachment extends toward one direction along the first axis while the one of the fourth, fifth of sixth sub-attachments of the second attachment extends toward the opposite direction along the first axis;
a position of the other of the first, second or third sub-attachments of the first attachment coincides with a position of the other of the fourth, fifth of sixth sub-attachments of the second attachment on the second axis; and
the other of the first, second or third sub-attachments of the first attachment extends toward one direction along the first axis while the other of the fourth, fifth of sixth sub-attachments of the second attachment extends toward the opposite direction along the first axis.

6. The vehicle of claim 1 wherein the second sub-attachment and the fourth sub-attachment are approximately a same width and have a same position on the first axis.

7. The vehicle of claim 1 wherein the fourth sub-attachment and the fifth sub-attachment are located on a same location in the first axis, but are displaced in the second axis.

8. The vehicle of claim 1 wherein the sixth sub-attachment is positioned in between the second sub-attachment and the third sub-attachment in the second axis direction.

* * * * *